(12) United States Patent
Lewis

(10) Patent No.: US 6,205,563 B1
(45) Date of Patent: *Mar. 20, 2001

(54) METHOD AND APPARATUS FOR INTER-DOMAIN ALARM CORRELATION

(75) Inventor: Lundy Lewis, Mason, NH (US)

(73) Assignee: Cabletron Systems, Inc., Rochester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/455,041

(22) Filed: Dec. 6, 1999

Related U.S. Application Data

(63) Continuation of application No. 09/094,428, filed on Jun. 8, 1998, now Pat. No. 6,000,045, which is a continuation of application No. 08/654,305, filed on May 28, 1996, now Pat. No. 5,768,501.

(51) Int. Cl.[7] ..................................................... G06F 11/30
(52) U.S. Cl. .............................. 714/47; 714/48; 709/223
(58) Field of Search ............................... 714/43, 47, 48, 714/4; 709/223, 224

(56) References Cited

U.S. PATENT DOCUMENTS

| | | |
|---|---|---|
| 5,293,323 | 3/1994 | Doskocil . |
| 5,309,448 | 5/1994 | Bouloutas et al. . |
| 5,436,909 | 7/1995 | Dev . |
| 5,640,505 | 6/1997 | Hearn et al. . |
| 5,696,486 | 12/1997 | Poliquin et al. . |
| 5,761,502 | 6/1998 | Jacobs . |
| 5,768,501 | 6/1998 | Lewis . |
| 6,000,045 | * 12/1999 | Lewis ..................................... 714/47 |

OTHER PUBLICATIONS

*L. Lewis, "Al and Intelligent Networks In The 1990's And Into The 21st Century," Chap. 7, pp. 109–124, *Worldwide Intelligent Systems*, J. Leibowitz and D.S. Prerau (Eds.), IOS Press, (Sep. 1995).

* cited by examiner

Primary Examiner—Robert W. Beausoliel, Jr.
Assistant Examiner—Scott Baderman
(74) Attorney, Agent, or Firm—Wolf, Greenfield & Sacks, P.C.

(57) ABSTRACT

A multi-domain network manager provides alarm correlation among a plurality of domains included in a communications network. Individual network management systems each monitor a single respective domain of the communications network, and provide intra-domain alarms indicative of status specific to the single respective domain. The multi-domain network manager receives the intra-domain alarms, and correlates them to provide inter-domain alarms as well as responses in the form of corrective actions. The multi-domain network manager thus provides a high level of correlation and response for the entire network while each network management system provides a lower level of correlation and response for an individual domain of the network.

7 Claims, 11 Drawing Sheets

METHOD AND APPARATUS FOR INTER-DOMAIN ALARM CORRELATION

This application is a continuation of application Ser. No. 09/094,428, filed Jun. 8, 1998, entitled "METHOD AND APPARATUS FOR INTER-DOMAIN ALARM CORRELATION," now U.S. Pat. No. 6,000,045, which is a continuation of application Ser. No. 08/654,305, filed May 28, 1996, now U.S. Pat. No. 5,768,501.

BACKGROUND OF THE INVENTION

1. Field of the Invention

This invention relates generally to communications networks, and more particularly, to communications networks having multiple domains, each of which may cause intra-domain alarms. These intra-domain alarms may be correlated to provide inter-domain alarms and to facilitate more effective user notification and corrective action.

2. Discussion of the Related Art

Computer networks are widely used to provide increased computing power, sharing of resources and communication between users. Networks may include a number of computer devices within a room, building or site that are connected by a high-speed local data link such as token ring, Ethernet, or the like. Local area networks (LAN's) in different locations may be interconnected by for example packet switches, microwave links and satellite links to form a wide area network (WAN). A network may include several hundred or more connected devices, distributed across several geographical locations and belonging to several organizations.

Many existing networks are so large that a network administrator will partition the network into multiple domains for ease of management. There are various types of domains. One example is based on geographical location. For example, a company may own or manage a network that includes a first domain geographically located in a first city and a second domain geographically located in a second city, as well as other domains disposed in other geographical locations.

Another domain type is based on organization or departments, e.g., accounting, engineering, sales, etc. A company may have a computer network spanning multiple organizations and multiple geographical locations, but there may not be a one-to-one mapping of organizations to geographical locations. Thus, a first organization and a second organization may both share network resources within first and second geographical locations. For purposes of network accounting (e.g., to allocate network charges to the appropriate organization) or for other reasons, it may be advantageous to consider the network resources of the first organization as being a separate domain from the network resources of the second organization.

A third example of a domain type is a grouping based upon functional characteristics of network resources. For example, one functional domain may be considered to be network resources belonging to a company that are provided for performing computer-aided design, which may draw upon common databases and have similar network traffic. Another functional domain may be network resources of the same company that are provided for financial analysis, which may be resources specially adapted to provide financial data. The network resources of these two domains may be distributed across several geographical locations and several organizations of the company. However, it may be desirable for a network administrator to group the computer-aided design network resources into one domain and to group the financial analysis network resources into another domain. Additional examples of communication network domains also exist, and a single company or organization may have domains that fall into several categories.

The above examples were discussed with respect to one company owning and managing its own network. Similar situations exist for any entity that manages and/or owns a network, for example a service company that provides network management services to several companies.

In the operation and maintenance of computer networks a number of issues arise, including traffic overload on parts of the network, optimum placement and interconnection of network resources, security, isolation of network faults, and the like. These issues become increasingly complex and difficult to understand and manage as the network becomes larger and more complex. For example, if a network device is not sending messages, it may be difficult to determine whether the fault is in the device itself, a data communication link, or an intermediate network device between the sending and receiving devices.

Network management systems are intended to resolve such issues. Older management systems typically operated by collecting large volumes of information which then required evaluation by a network administrator, and thus placed a tremendous burden on and required a highly-skilled network administrator.

Newer network management systems systematize the knowledge of the networking expert such that common problems of a single domain (i.e., a portion of the network under common management) can be detected, isolated and repaired, either automatically or with the involvement of less-skilled personnel. Such a system typically includes a graphical representation of that portion of the network being monitored by the system. Alarms are generated to inform an external entity that an event has occurred or requires attention. Since a large network may have many such events occurring simultaneously, some network management systems provide alarm filtering (i.e., only certain events generate an alarm).

Commercially available network management systems and applications for alarm filtering include: (1) SPECTRUM®, Cabletron Systems, Inc., 35 Industrial Way, Rochester, N.H. 03867; (2) HP OpenView, Hewlett Packard Corp., 3000 Hanover Street, Palo Alto, Calif. 94304; (3) LattisNet, Bay Networks, 4401 Great American Pkwy., Santa Clara, Calif. 95054; (4) IBM Netview/6000, IBM Corp., Old Orchard Road, Armonk, N.Y. 10504; (5) SunNet Manager, SunConnect, 2550 Garcia Ave, Mountain View, Calif. 94043; and (6) NerveCenter, NetLabs Inc., 4920 El Camino Real, Los Altos Calif. 94022.

However, in each instance the existing network management system manages only a single domain. For example, a company having a network consisting of several domains will typically purchase one copy of a network management system for each domain. Each copy of the network management system may be referred to as an instance. Thus, in the functional domain example described above, a first instance of a network management system may manage the computer-aided design domain, while a second instance of a network management system may manage the financial analysis domain. Each instance of the network management system receives information only from the resources of a single respective domain, and generates alarms that are specific only to the single respective domain. Such alarms may be referred to as intra-domain alarms.

Because each instance of a network management system manages only one domain, there is currently no diagnosis or management which takes into account the relationships among multiple domains. Since domains may be interconnected, an intra-domain alarm might be generated for a first domain, even though the event or fault that is causing the intra-domain alarm may be contained within the network resources of a different domain. For example, a first domain in a network may include a router that forwards network traffic to a resource in a second domain. If the router fails or begins to degrade, the performance of the second domain may appear sluggish (e.g., excessive delays, low throughput), even though the network resources within the second domain are operating correctly. This sluggishness may cause an alarm to be generated from the instance of the network management system that manages the second domain. However, no alarm relating to this situation has been generated by the first instance of the network management system that manages the first domain, because there is no performance degradation within the first domain. It is currently necessary to apply human intervention and human reasoning to resolve such a situation.

SUMMARY OF THE INVENTION

According to one aspect of the invention, a multi-domain alarm manager provides alarm correlation among a plurality of domains in a communications network. Individual network management systems each monitor a single respective domain of the communications network, and provide intra-domain alarms indicative of status specific to the single respective domain. The manager receives the intra-domain alarms, and correlates them to provide inter-domain alarms as well as responses in the form of corrective actions. The manager thus provides a high level of correlation and response for the entire network while each single-domain network management system provides a lower level of correlation and response for an individual domain of the network.

According to a method embodiment of the invention, the method comprises the steps of receiving a first intra-domain alarm from a first domain, receiving a second intra-domain alarm from a second domain, and correlating the first alarm with the second alarm to generate an inter-domain alarm.

In the above embodiments, the inter-domain alarm may be analyzed to determine a corrective action, and a command may be provided to a network resource within the communications network to implement the corrective action. Moreover, status information may be received from at least one resource in the first domain, and a first portion of the status information may be correlated to generate a first intra-domain alarm. A second portion of the status information may be correlated to determine a second corrective action, and a second command may be provided to a second network resource within the communications network to implement the second corrective action.

In a particular embodiment, correlating includes determining a domain that is adjacent to a first domain. Correlating may also include determining a severity of a condition indicated by a combination of a first intra-domain alarm and a second intra-domain alarm, the inter-domain alarm including an indication of the severity of the condition. Additionally, correlating may include providing a first intra-domain alarm and a second intra-domain alarm to a state machine, and receiving an output from the state machine indicative of a severity and a correlation of a combination of the first intra-domain alarm and the second intra-domain alarm.

By providing two levels of correlation, one at the network management system level (within a domain) which utilizes for example model based reasoning, and a second at the alarm manager level (across multiple domains) which utilizes for example a state transition graph (or case based reasoning or intelligent systems), an improvement in scaleability is provided not possible with prior systems.

BRIEF DESCRIPTION OF THE DRAWINGS

These and other features and advantages of the present invention shall appear from the following description of an exemplary embodiment, said description being made with reference to the appended drawings, of which.

DETAILED DESCRIPTION

In accordance with a specific embodiment of the present invention, a multi-domain manager provides correlation among network domains having entities that make up a communications network. The network entities (also known as network resources), include not only hardware devices such as personal computers (PCS), workstations, hubs, routers, bridges, and repeaters, but also software applications. The manager facilitates high-level insight into the operation of a network that has previously not been feasible without highly-skilled human intervention.

Figure 1:
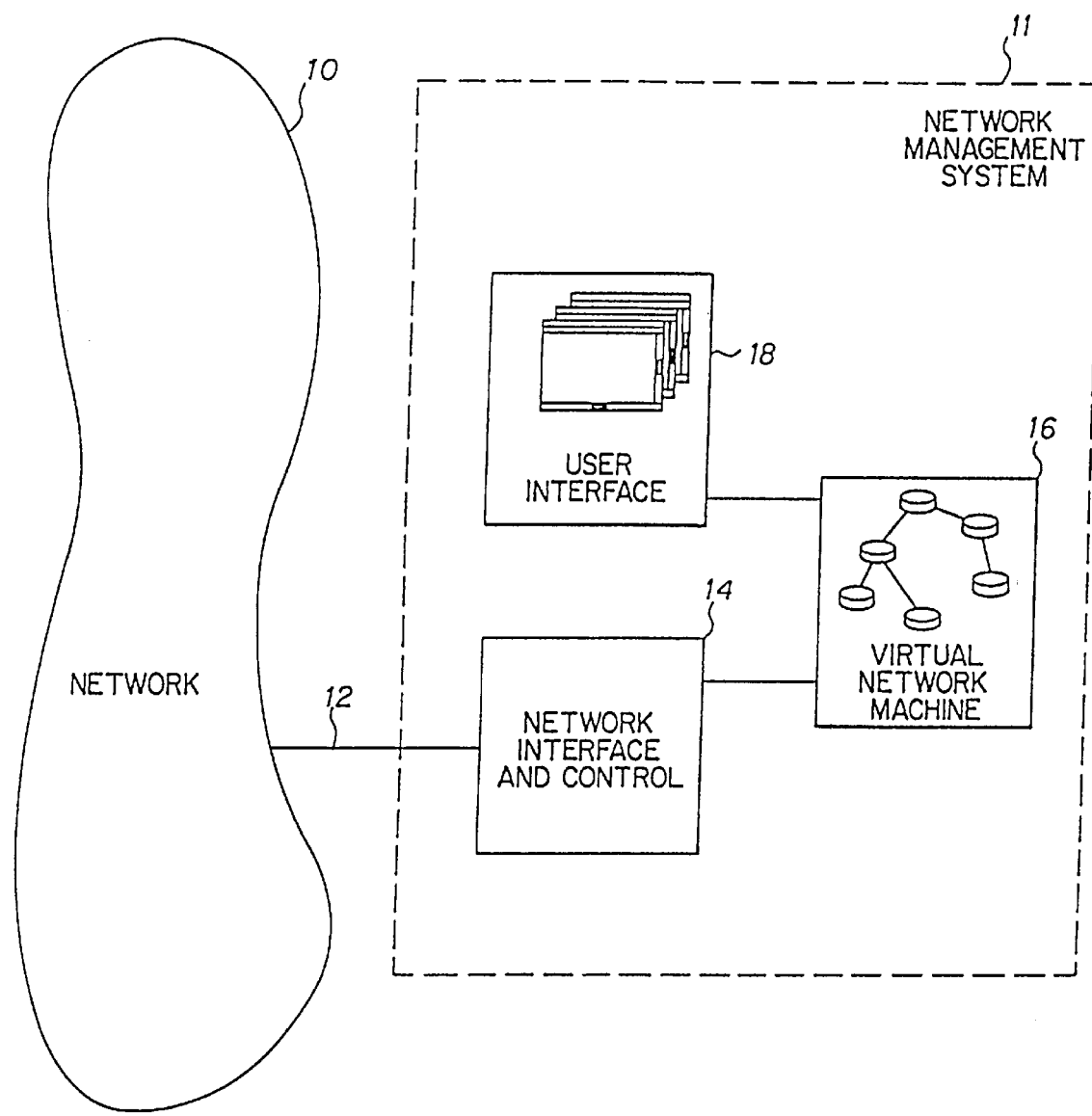
FIG. 1 is a schematic illustration of the relationship between a network and a network management system.

FIG. 1 is a block diagram illustrating generally the arrangement of a network management system 11 which monitors a live network 10 via a communication interface 12. In this example the network management system (NMS) 11 is a client-server based NMS known as SPECTRUM®, which includes a database of models relating to corresponding network entities and relationships among those entities.

The SPECTRUM server includes a network interface and control module 14 and a virtual network machine 16, and the SPECTRUM client includes a user interface 18.

The SPECTRUM network management system (NMS) continually monitors the network 10 and maintains a database of information about managed entities within the network 10. An understanding of the present invention is furthered by an understanding of a model-based network management system such as SPECTRUM, which is described in U.S. Pat. No. 5,261,044, issued Nov. 9, 1993 to R. Dev et al., and hereby incorporated by reference in its entirety. The SPECTRUM system is commercially available and also described in various user manuals and literature available from Cabletron Systems, Inc., Rochester, N.H.

In summary, SPECTRUM is a system for maintaining and processing information pertaining to the condition of the computer network and providing the same to a user, the network including a plurality of network resources such as computer devices and software applications being executed on such devices. The system includes a virtual network machine 16, comprising a programmed digital computer, wherein a program is implemented using an object-oriented programming language such as C++, Eiffel, SmallTalk, and Ada. The virtual network machine 16 includes interrelated intelligent models of network entities and relations between network entities, including a capability for acquiring network data pertaining to the condition of a network entity from the corresponding network entity, and for those entities not capable of being contacted, inferring their status from the status of other entities. The virtual network machine 16 maintains objects which include network data relating to the corresponding network entity and one or more inference handlers for processing the network data, the inference handlers being responsive to changes occurring in the same and/or a different object. The network data can then be transferred to a user interface 18 coupled to the virtual network machine 16, for supplying the network data to a user.

Thus, the models may be implemented as software "objects" containing both "data" (attributes) relating to the corresponding network entity and one or more "inference handlers" (functions) for processing the data. See Grady Booch, "Object-Oriented Analysis And Design, With Applications," 2nd Edition, Benjamin/Cummings Publishing Co., Redwood City, Calif., Chapter 2 (1994). The inference handlers may be initiated by predetermined virtual network events, such as a change in specified network data in the same model, a change in specified network data in a different model, and predefined events or changes in models or model relations. Information pertaining to the condition of the network resource can be obtained from the network entity by polling the resource, can be automatically received from the network resource without polling, or can be inferred from data contained in other models. An alarm condition may be generated when the network data meets a predetermined criteria. Events, alarms and statistical information from the virtual network may be stored in a database to be selectively displayed for the user.

The data in the SPECTRUM database may be used for generating topological displays of the network, showing hierarchial relationships between network devices, isolating a network fault, reviewing statistical information, as well as other functions.

The SPECTRUM network management system allows for collective management of autonomous local area networks (LANs), with equipment from different vendors. It complies with the current Simple Network Management Protocol (SNMP) standards, and can also accommodate other standard and proprietary protocols. The virtual network machine 16 preprocesses the raw information coming from the network entities through the network interface and control module 14 in order to construct a model of the network's current status and performance characteristics. Network entities that cannot be directly communicated with (e.g., cables and buildings) can infer their status from the status of the entities connected to or contained within them. The virtual network machine 16 provides a consistent interface for management applications to access any of the information in the model and thereby provides these applications with a unified view of the network 10.

The SPECTROGRAPH® user interface 18 provides a highly graphical multi-perspective view into the network model. The user interface enables the user to navigate through a landscape in which cables, networks, local area networks and even rooms show up as icons, and which icons indicate the health and performance characteristics of those elements. Many of these icons can be further queried for additional information. The main function of the user interface 18 is to visually present to the user the model within the virtual network machine 16. It allows the user to navigate freely within the network model, only limited by the access rights assigned by the network administrator. The information can be accessed at varying degrees of detail, from a macro overview, down to the level of the devices and the cables which connect them. In addition. to its navigation functions, the SPECTROGRAPH user interface provides an alarm management facility, an event log window, a reporting facility, a find facility, and other features.

Figure 2:
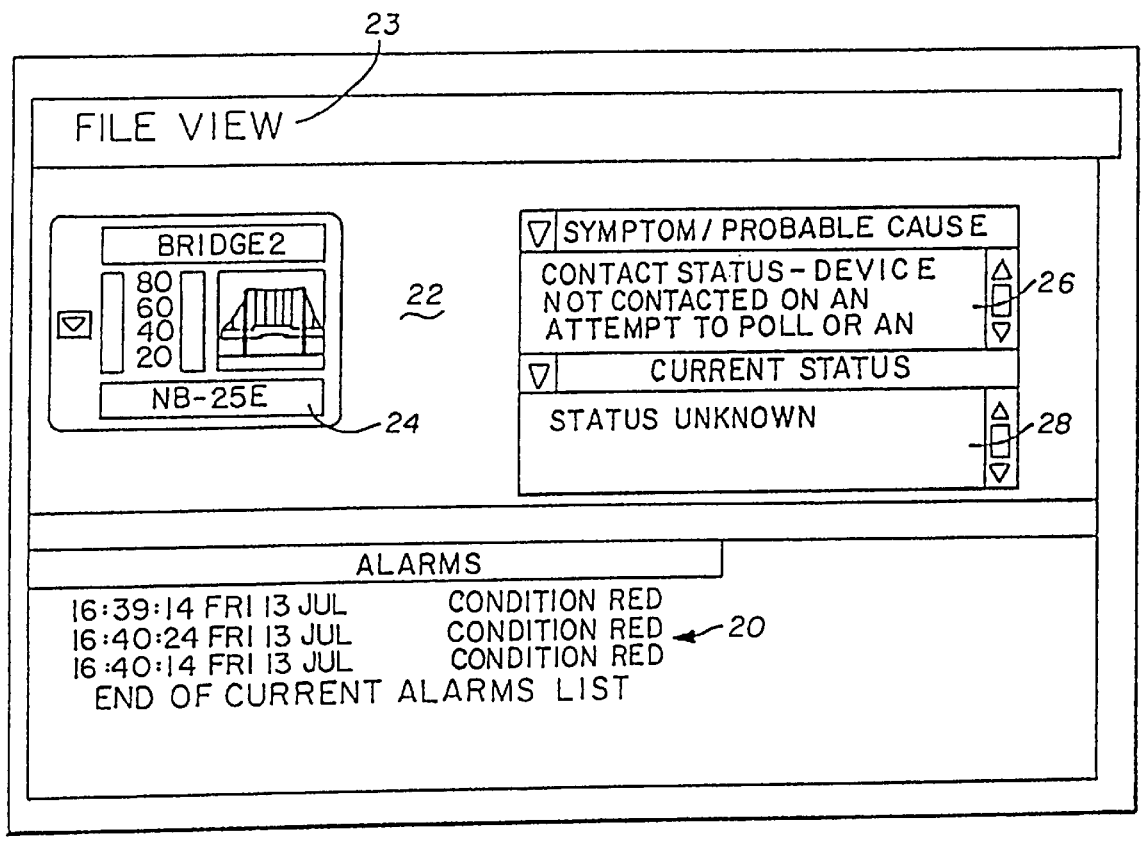
FIG. 2 is a view of a user interface of a network management system such as that shown in FIG. 1.

An example of the alarm log view provided by the SPECTROGRAPH user interface 18 is illustrated in FIG. 2. The alarm log view 23 may include an area 20 for the listing of current alarms, and an area 22 for displaying information pertaining to a selected alarm. A user, such as a system administrator or a technician, may select a particular alarm in the listing of current alarms to obtain more information. A multi-function icon 24 representing the network device having the fault is displayed in area 22, and one or more text fields 26 and 28 which provide information regarding the cause of the alarm and the status of the device. By selecting specified areas of the icon 24, the user can obtain further information regarding the device for which an alarm is registered.

Alternatively, instead of or in combination with the user interface 18, information from the virtual network machine 16 may be provided directly to another computer program, or may be provided to a user via electronic mail or a telephone message that is automatically transmitted.

One method for fault management in large communications networks is to use a "trouble-ticketing" system. This system provides a number of tools for use by network users, administrators, and repair and maintenance personnel. The basic data structure, a trouble-ticket, has a number of fields in which a user can enter data describing the parameters of an observed network fault. A trouble-ticket filled out by a user may then be transmitted by, for example, an electronic mail system to maintenance and repair personnel. A trouble-ticket describing a current network fault requiring attention or action is referred to as an outstanding trouble-ticket. When the network fault has been corrected, the solution to the problem, typically called a resolution, is entered into an appropriate data field in the trouble-ticket and the trouble-ticket is classified as being completed. The system stores completed trouble-tickets in memory and thus a library of such tickets is created, allowing users, administrators, and maintenance and repair personnel to refer to the same for assistance in determining solutions to future network faults.

An example of a trouble-ticketing system is the ACTION REQUEST system, developed by Remedy Corporation, Mountain View, Calif., and sold by Cabletron Systems, Inc., Rochester, N.H. ARS Gateway™ is an application sold by Cabletron Systems, Inc. which incorporates the SPECTRUM and ACTION REQUEST systems, i.e., the ARS Gateway application receives fault information from the SPECTRUM system and automatically generates and processes a trouble-ticket. The ARS Gateway system is described in copending and commonly owned U.S. Ser. No. 08/023,972 filed Feb. 26, 1993 by Lundy Lewis, entitled "Method and Apparatus For Resolving Faults In Communications Networks," which is hereby incorporated by reference in its entirety.

As described earlier, however, each instance of the previously existing network management system manages only a single domain, and thus will correlate events only within the single domain to generate one or more inter-domain alarms. An improvement over these prior systems is the SPECTRUM Alarm Notification Manager (SANM), which utilizes policy-based filters to create an alarm notification policy that may apply to alarms received from several instances of a network management system. Such a system is described in copending and commonly owned U.S. Ser. No. 08/558,425 filed Nov. 16, 1995 by Arrowsmith et al., entitled "Method and Apparatus For Policy-Based Alarm Notification in a Distributed Network Management Environment," which is hereby incorporated by reference in its entirety.

Figure 3:
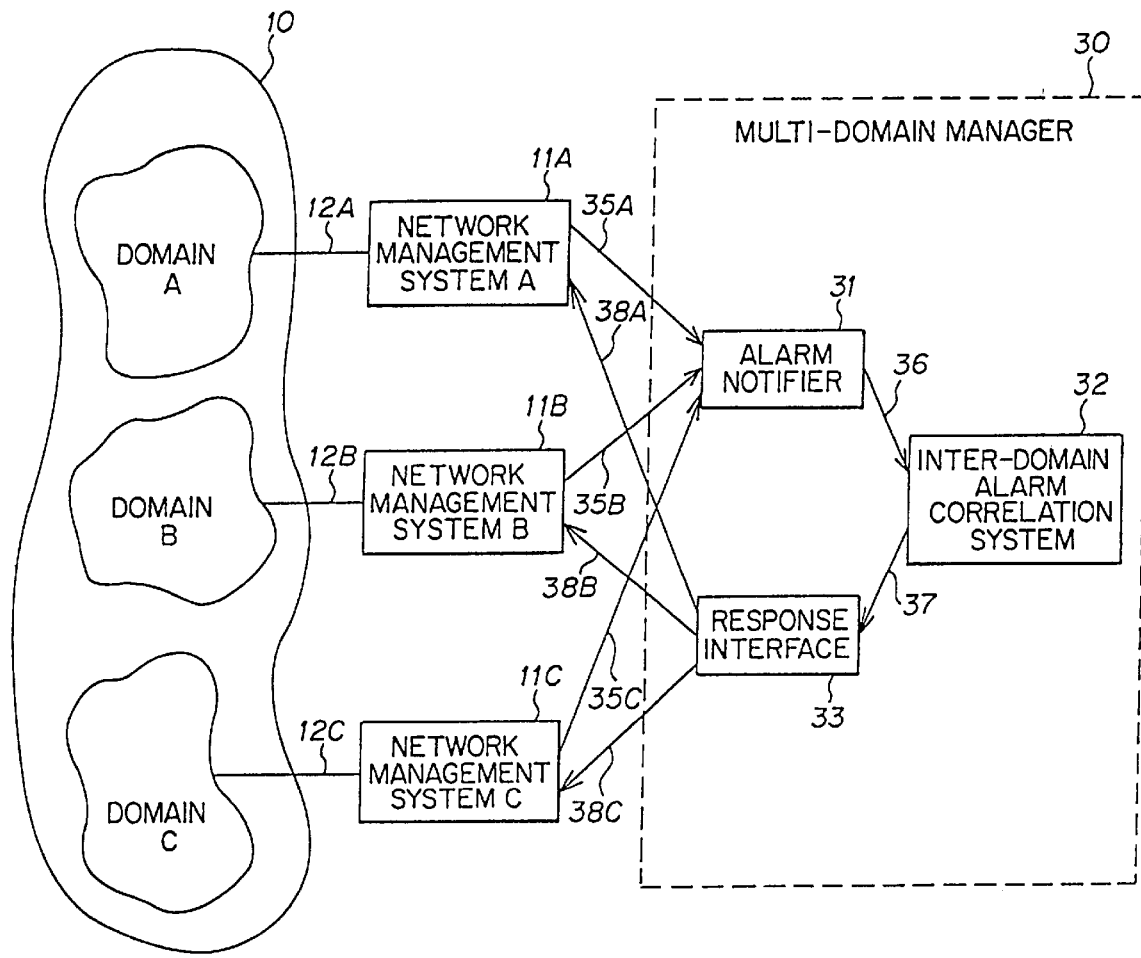
FIG. 3 is a schematic illustration of one embodiment of the invention, in which a multi-domain manager operates in conjunction with a plurality of single-domain network management systems, each of which monitors a single respective domain of a communications network.

FIG. 3 illustrates an embodiment of the invention in which intra-domain alarms are correlated and analyzed to provide inter-domain alarms, corrective actions, and other responses. A communications network 10 is arranged into a plurality of domains—domain A, domain B, and domain C. Network management system (NMS) 11A manages only domain A via interface 12A, NMS 11B manages only domain B via interface 12B, and NMS 11C manages only domain C via interface 12C. The NMSs 11A–C may be different instances of one type of NMS, or may be instances of different network management systems such as those described earlier. The NMSs 11A–11C need not be directly connected to their respective domains A–C, but some path will exist for information transfer between each NMS 11A–11C and its respective domain A–C.

The information transfer from the domains A–C to their respective NMS 11A–11C typically includes messages regarding the status of network resources within the respective domain. For example, a network resource may be a device that includes built-in-test functions. When such functions indicate that the device may be faulty or degraded, a message is provided to the NMS. Additionally, some devices monitor network parameters such as throughput and error rate, and provide results to the NMS. The NMS may perform certain monitoring functions as well. Generally, a message provided from a network resource to an NMS may be referred to as a report, and a succession of such reports is typically referred to as an event stream.

As shown in FIG. 3, each NMS 11A–11 C is operatively coupled to the multi-domain manager 30, in order to provide messages to and receive responses back from the manager 30. In particular, NMS 11A monitors domain A via interface 12A, produces intra-domain alarms 35A that are specific to domain A, and provides the intra-domain alarms 35A to the manager 30. Similarly, NMS 11B monitors domain B via interface 12B, produces intra-domain alarms 35B and provides them to manager 30 and NMS 11 C monitors domain C via interface 12C, produces intra-domain alarms 35C and provides them to manager 30. The manager 30 correlates the intra-domain alarms 35A–35C and provides in response inter-domain alarm responses 38A–38C to one or more of the NMSs 11A–11 C.

According to one embodiment of the invention, manager 30 includes an alarm notifier 31, an inter-domain alarm correlation system 32, and a response interface 33. Alarm notifier 31 receives intra-domain alarms on links 35A–35C from the NMSs 11A–11C and provides them on link 36 to correlation system 32. Correlation system 32 provides inter-domain responses on link 37 to response interface 33, which in turn provides the inter-domain responses on one or more of links 38A–38C to the respective NMSs 11A–11C.

The inter-domain responses may include inter-domain alarms, commands, and requests for more information. An example of an inter-domain alarm is a notification that a router in domain A may be faulty or degraded, and thus may affect the throughput or other performance characteristics of domain B. An example of a command is a command to re-route data from domain A intended for domain B through a different router than the faulty or degraded router. A request for information may be generated by correlation system 32 when, for example, an intra-domain alarm has been received, but a sufficient inter-domain alarm cannot be generated until additional information is received. Accordingly, the messages from domains A–C may also include responses to requests for information, which may or may not be alarms as previously defined.

The structure illustrated in FIG. 3 allows for event and alarm correlation to be performed at multiple levels of abstraction, and thus facilitates quick corrective action by NMSs 11A–11C to some events, while also providing more highly-correlated inter-domain responses (e.g., from manager 30) to events that may be of a more complex nature.

Figure 4A:
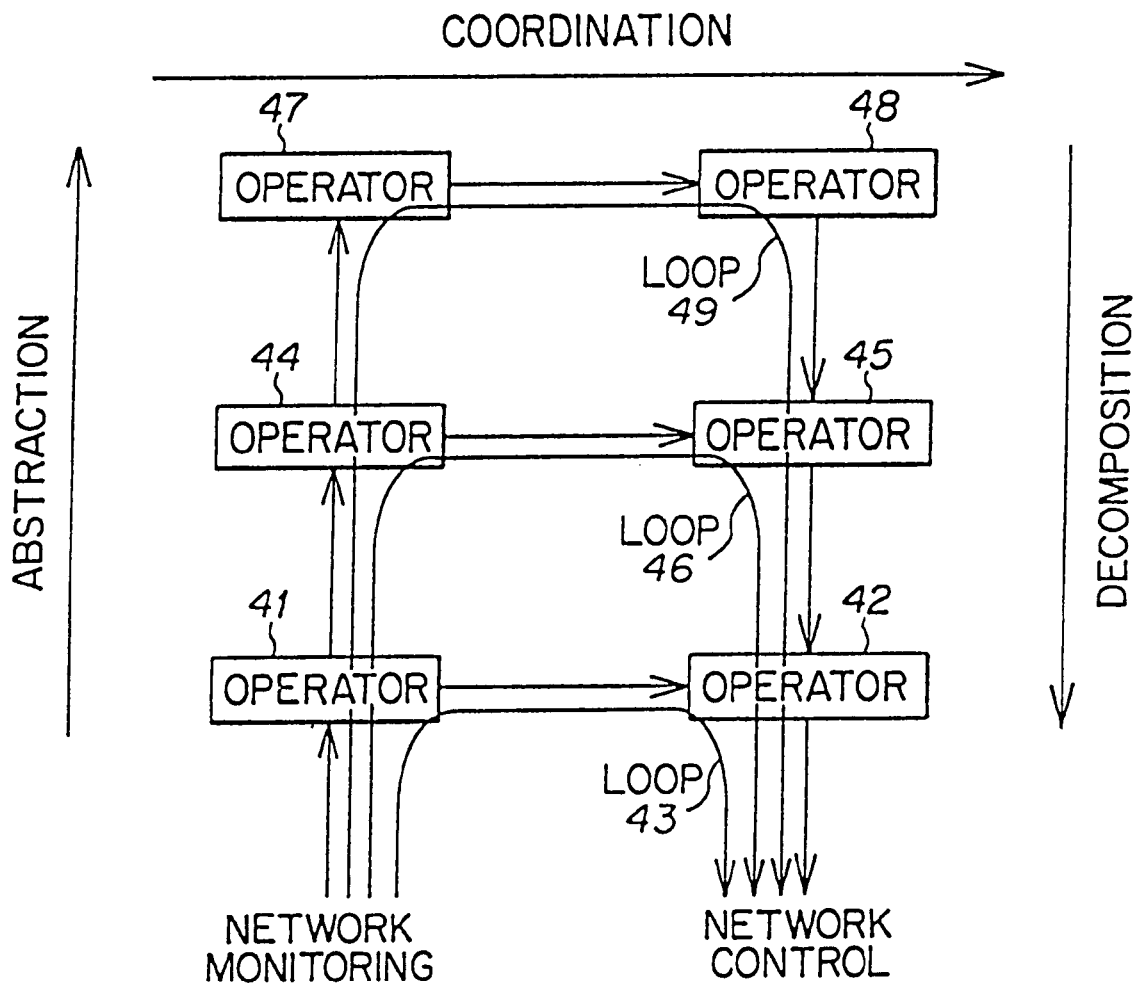
FIG. 4A is a schematic flow diagram of a multiple-loop architecture according to one embodiment of the invention.

FIG. 4A illustrates a multiple loop architecture (MLA) that facilitates multiple levels of coordination in network management. FIG. 4A is generalized to represent a system having inputs (network monitoring) and outputs (network control). A first (lower) level of coordination includes operator 41 and operator 42, which are coupled together to provide a first control loop 43. With respect to FIG. 4A, the term "operator" may mean any entity that performs an aspect of control processing at a particular level. Such an operator may be an individual computer or software routine, specialized hardware, or a portion of software on a general purpose computer.

Operators 41 and 42 represent a first level of abstraction, and a first level of coordination takes place between operators 41 and 42 to provide output in response to some inputs. Operators 44 and 45 represent a second (higher) level of abstraction, and thus a second control loop 46 includes operators 41, 42, 44, and 45. Operators 47 and 48 represent a third (highest) level of abstraction, and thus a third control loop 49 includes operators 41, 42, 44, 45, 47, and 48. Generally, the coordination that takes place at a lower level, for example, the first level via first loop 43, is simpler than higher level coordination and thus can be achieved in less time and with less resources. Lower level coordination may be referred to as reflexive behavior that generates short-term solutions, while higher level coordination may be referred to as deliberative behavior that generates longer-term solutions.

Each control loop 43, 46, 49 may be viewed as a separate control loop that corresponds to a specific class of problems, where problems are partitioned and assigned to levels according to the amount of time and type of information required to solve the problems. For example, the short-term abstraction/coordination/decomposition (first loop 43) at the lowest level typically operates on raw data and provides quick reaction, bypassing upper level control mechanisms. In the field of computer networks, such tasks might include intelligent routing and temporary disconnections to a network resource such as a host that is too busy to effectively communicate.

The second loop 46 may provide reaction to more complex problems and operates on increasingly abstract input such as signs and symbols. Tasks for the second loop 46 may include alarm correlation for a single domain of a network, where some alarms represent actual problems and other alarms are only apparent problems. Due to the information that the second control loop 46 contains regarding network resources of a single domain, it is possible to distinguish between actual problems and apparent problems to achieve effective alarm filtering.

The third control loop 49 may provide reaction to problems that require more time as well as a higher class of information. An example of a task performed by the third loop 49 is reasoning involved in deciding to re-allocate a host from domain A to domain B because a majority of the host's clients reside in domain B, thereby causing increased but unnecessary traffic on a link between domain A and domain B.

Figure 4B:
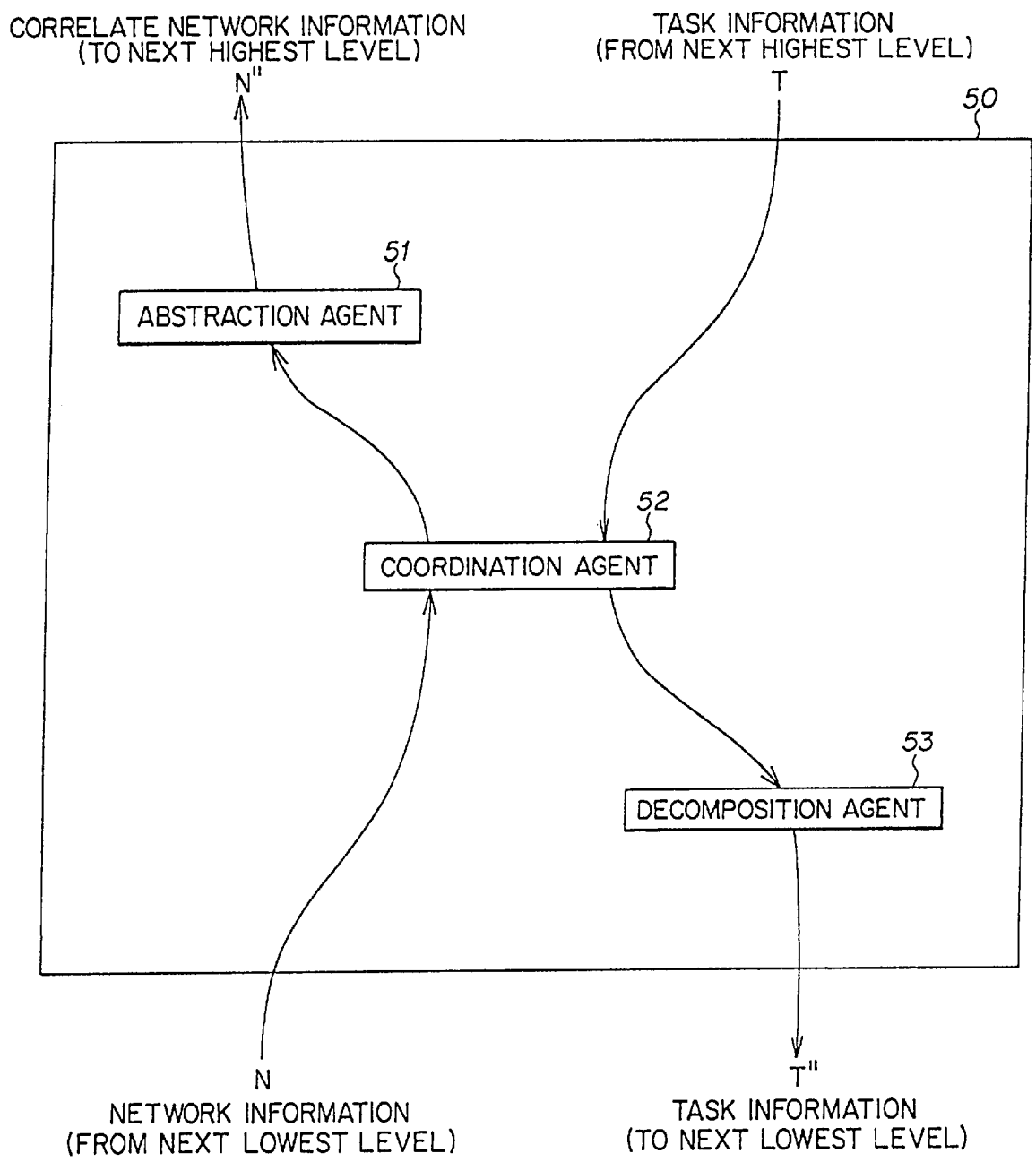
FIG. 4B is a more detailed flow diagram of one level of operation of FIG. 4A.

FIG. 4B shows an example of a single level of operation of the multi-loop architecture of FIG. 4A. The single level 50, which may represent both operator 44 and operator 45 of FIG. 4A, includes an abstraction agent 51, a coordination agent 52, and a decomposition agent 53. The coordination agent 52 evaluates network information N handed up from the level beneath and a task T handed down from the level above, and passes information (for example, a modified task) to the decomposition agent 53 and passes network information (possibly modified) to the abstraction agent 51. The decomposition agent 53 receives the task information T, decomposes it, and transmits the resulting task information T''' to a coordination agent on the level beneath. The abstraction agent 51 receives the network information N, abstracts it, and transmits the correlated network information N'' to a coordination agent on the level above.

The inputs to a given level L are network information (N) from next lower level L−1, and task information (T) from next higher level L+1. N and T may be represented as state vectors wherein N is the current state of the environmenti-platform (such as an operating efficiency of a network domain) and T is the goal state. Here, the coordination agent 52 computes the difference between N and T. A significant difference between N and T may denote a problem. The solutions to the problem, from the perspective of level L, are N' and T', where N' is new network information and T' is a new task (i.e. a solution). There exist four solution types, as shown in Table 2, based upon a result of the computation of the difference between N and T.

TABLE 2

| | Solution Types | |
|---|---|---|
| | N' | T' |
| Case 1: | nil | nil |
| Case 2: | nil | non-nil |
| Case 3: | non-nil | nil |
| Case 4: | non-nil | non-nil |

In case 1, there is likely no problem, as exemplified by "nil" N' and T'. Thus, N=N' and T=T'. N is abstracted into N'' and transmitted to level L+1, and T' is decomposed into T''' and transmitted to level L−1.

In case 2, there may be a problem within the range of expertise of the single level 50. Thus, N=N' and the coordination agent 52 generates task T'=f(T), where f is a function which transforms T into T', e.g. a lookup table. T' is decomposed into T''' and transmitted to level L−1, and N' is abstracted into N'' and passed to level L+1. Note that T''' replaces the old task, as instructed by the coordination agent 52.

In case 3, there may be a problem that is beyond the range of expertise of the single level 50. Thus, the coordination agent 52 generates N'=g(N) and T=T', where g is a function which transforms N into N' to yield, for example, additional network information. N' is abstracted into N'' and transmitted to level L+1, and T' is decomposed into T''' and transmitted to level L−1. Note that N'' contains an abstraction of N plus information relating to a problem perceived by the coordination agent 52.

In case 4, there may be a problem which the single level 50 can offer a partial (possibly incomplete) solution. Here, the coordination agent 52 generates information N'=g(N) and task T'=f(T). Case 4 exemplifies a situation in which two or more levels will have to contribute partial solutions to a problem that may not be effectively solved by any one level alone.

Other approaches may be implemented to perform functions similar to those described with respect to FIG. 4B, in order to provide a hierarchical network management system.

Figure 5:
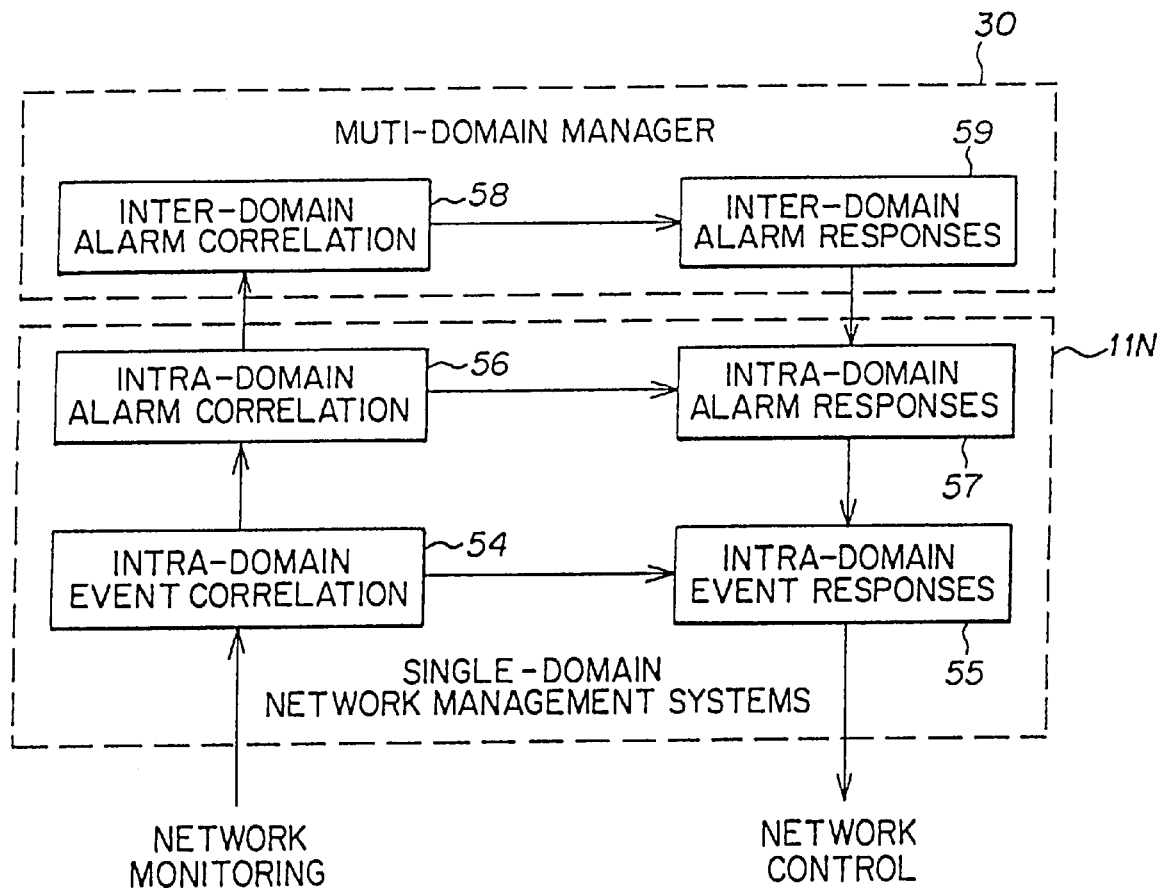
FIG. 5 is a block diagram correlating the different levels of the multiple-loop architecture of FIG. 4A to the elements of FIG. 3.

FIG. 5 is a functional flow diagram illustrating different levels of correlation and response, similar to FIG. 4A, as applied to the multi-domain manager 30 and any one instance of a network management system 11N. For inter-domain correlation, a plurality of network management systems, for example systems 11A–11C may be implemented, but only a single instance 11N is depicted in FIG. 5 for clarity. A first lower level of correlation and response includes intra-domain event correlation operator 54 and intra-domain event response operator 55, forming a first control loop. A second mid-level of correlation and response includes intra-domain alarm correlation operator 56 and intra-domain alarm response operator 57, forming a second control loop. The second control loop may require more time as well as more information from the network resources in the domain monitored by the network management system 11N. Both the first and second control loops take place within one instance of a network management system 11N, and provide correlation and response for the single domain managed by that NMS 11N.

A third high level of correlation and response includes inter-domain alarm correlation operator 58 which may operate on the results of intra-domain alarm correlation 56 from one or more instances of a network management system, and inter-domain response operator 59. The results of the response operator 59 are provided to the appropriate network management systems as discussed earlier, and may include inter-domain alarms, commands, and requests for additional information. Due to the hierarchial nature of the correlation disclosed herein, the multi-domain manager may receive intra-domain alarms, correlate them as necessary, and provide a single user with insight as to the status of several networks.

Figure 6:
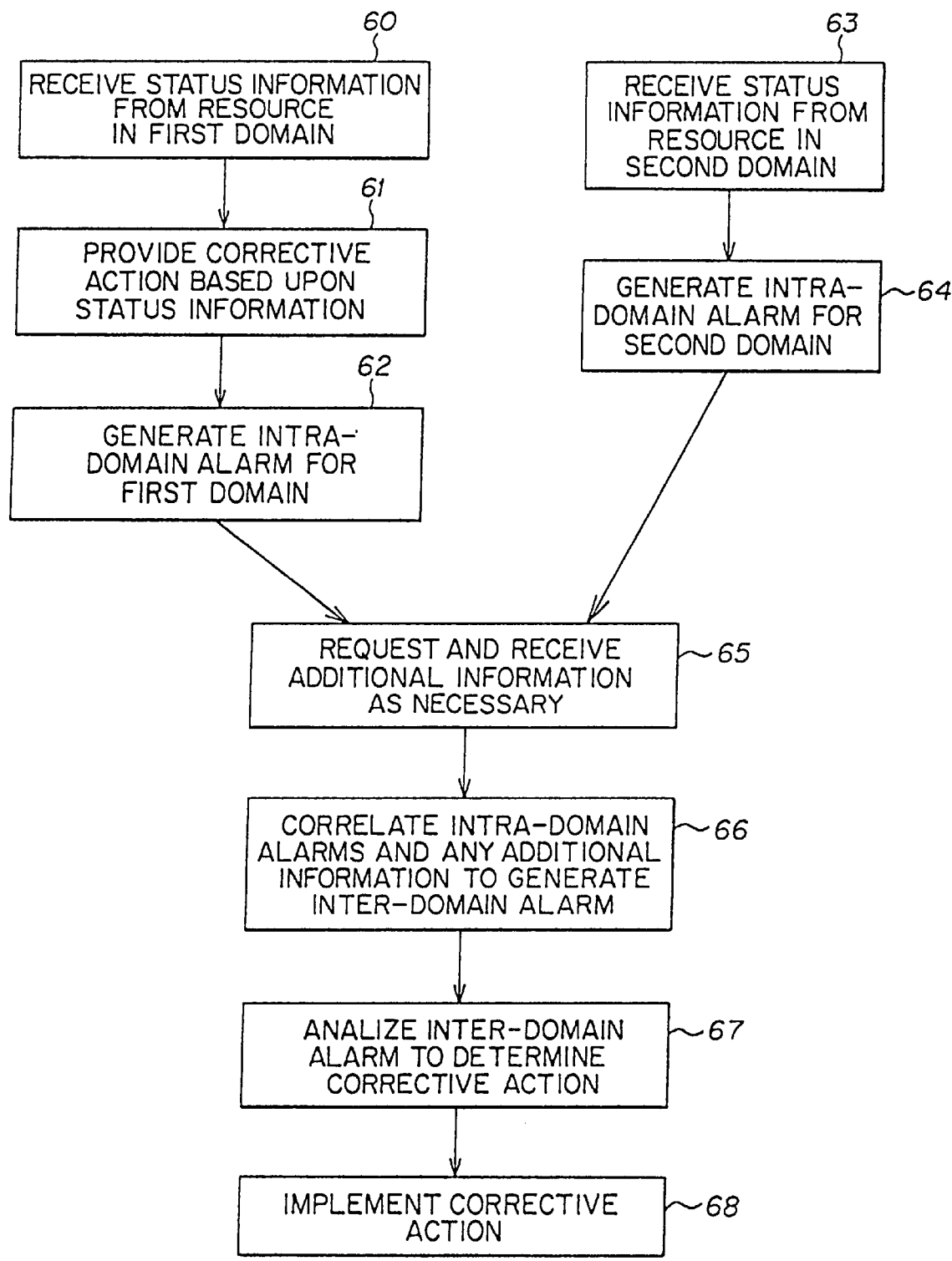
FIG. 6 is a flow diagram showing the steps of a process in accordance with an embodiment of the invention.

FIG. 6 is a flow chart of a method embodiment of the present invention. In FIG. 6, steps 60–62 are typically performed by one instance (e.g., 11A of FIG. 3) of a single-domain network management system, and steps 63–64 are typically performed by a second instance (e.g., 11B of FIG. 3) of a single-domain network management system. Steps 65–68 are performed by the multi-domain manager 30 shown in FIG. 3. In one embodiment, one single-domain NMS 11N may also contain the manager 30.

In step 60, status information is received from a resource in a first domain, such as domain A in FIG. 3. NMS 11A may provide corrective action as shown in step 61, if there exists sufficient information upon which to determine such action. In step 62, an intra-domain alarm is generated, which may be provided to a user in any manner previously described. This intra-domain alarm is also provided to the multi-domain manager 30.

In step 63, status information is received from a resource in a second domain, such as domain B. In response, NMS 11B generates an intra-domain alarm in step 64. (Alternatively, lower level corrective action could take place as in step 61).

In step 65, information in addition to the two intra-domain alarms may be requested and received by the manager; such action is not required. An inter-domain alarm is generated in step 66 by correlating the intra-domain alarms together and with any additional information. This inter-domain alarm may then be sent to users or to any appropriate NMS or individual network entities, as described below with respect to FIG. 7.

In step 67, the inter-domain alarm is analyzed to determine any corrective action, and in step 68 such corrective action is implemented. Because a multi-domain manager has insight into the operation and structure of several domains, such corrective action may be more effective than corrective action determined only from a limited amount of information (i.e., available from a single domain).

Figure 7:
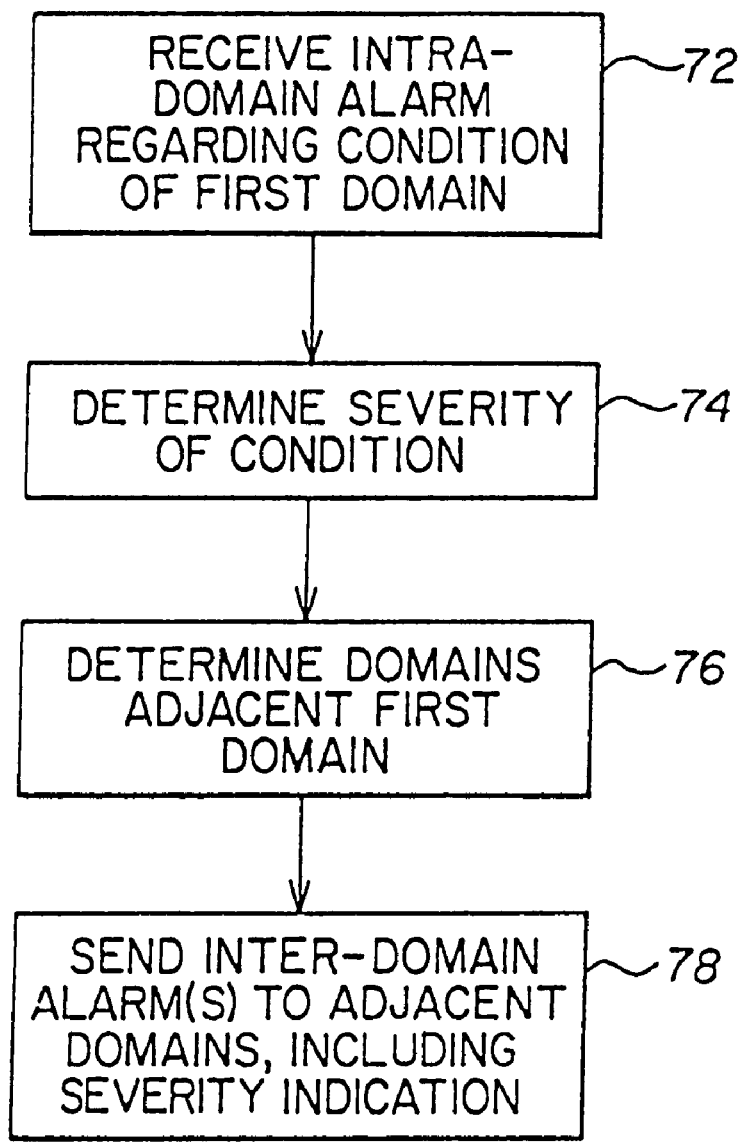
FIG. 7 is a flow diagram showing steps of a process in which intra-domain alarms are received and responded to, as performed by an embodiment of the inter-domain alarm correlation system depicted in FIG. 3.

FIG. 7 illustrates steps of a process performed by one particular embodiment of the inter-domain alarm correlation system 32 (of FIG. 3). In step 72, an intra-domain alarm is received, for example from NMS 11A. Such an intra-domain alarm may represent a non-critical condition, for example a one-time event, or it may represent a severe condition that may soon impact other domains B, C of the network 10. Accordingly, in step 74, the severity of the condition (represented by the intra-domain alarm) is determined. If the severity is sufficiently great, an inter-domain alarm is sent to some or all of the domains on the network 10. In one approach, as shown in step 76, domains adjacent to domain A are determined, and in step 78 the inter-domain alarm is sent to the NMSs 11B, 11C of each adjacent domain.

An inter-domain alarm may include an indication of the severity of the condition which caused the alarm, in case any of the NMSs 11B, 11C have different corrective actions that depend upon the severity.

Figure 8:
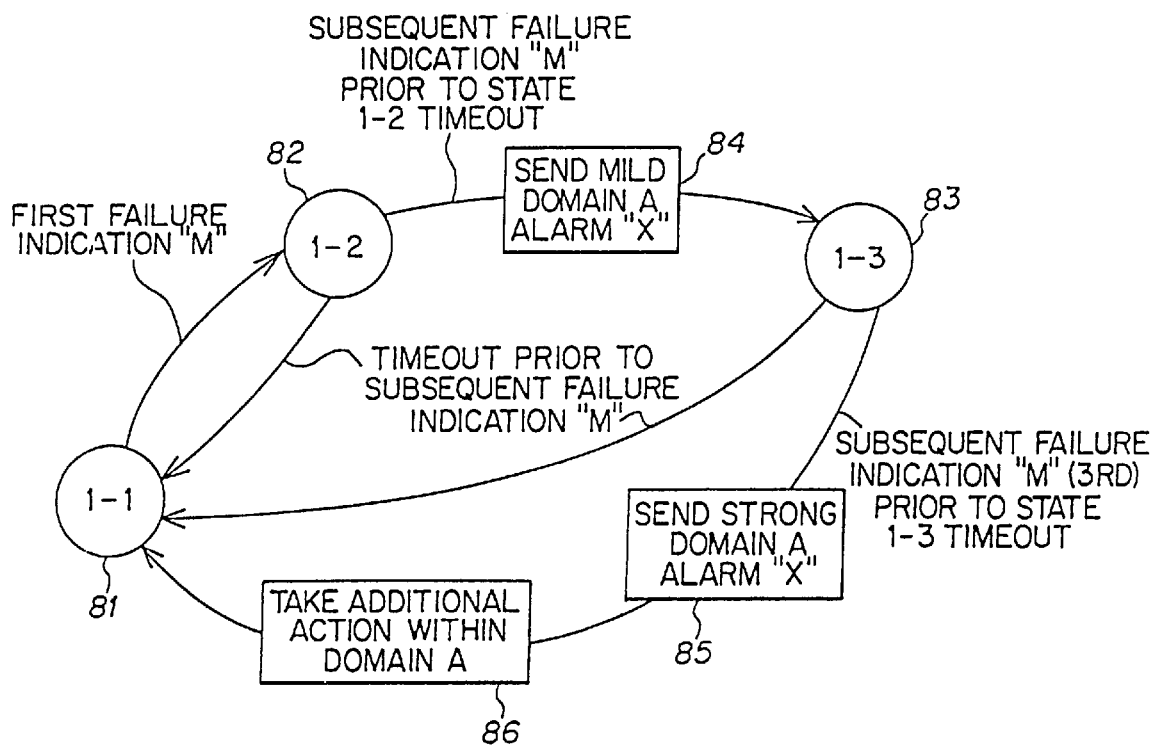
FIG. 8 is a state transition diagram illustrating a method of determining the severity of a condition indicated by one or more intra-domain alarms from a single domain.

FIG. 8 shows a state transition diagram (STG) by which the severity of a condition may be determined for a single domain ("domain A"). FIG. 8 is simplified in that only three states are shown, and only with respect to one type of failure indication ("failure indication A"). Such an STG may be implemented within a single-domain network management system, for example 11A in FIG. 3.

In state 1-1 (81), no failure indications have been received, and accordingly no alarms are sent. When a failure indication "M" is received from a device within domain A, the system is transitioned to state 1-2 (82). In order to reduce false alarms, for example if a non-critical transient condition caused the first failure indication "M" to be received, no alarm is sent while in state 1-2 (82). Additionally, if a certain time elapses (e.g., one minute) prior to receiving another subsequent failure indication of type "M", then the system is transitioned back to state 1-1 (81). If instead, a subsequent failure indication "M"0 is received prior to the state 1-2 (82) timeout, then the system will transition to state 1-3 (83). In this example, state 1-3 (83) is indicative of a mild condition, so a mild domain A alarm "X" may be sent, as shown in action 84. Alarm "X" is an intra-domain alarm, because it was generated from information regarding only a single domain A. Alarm "X" may be processed as indicated previously, but may also be sent to a multi-domain manager for further processing as described in more detail below.

From state 1-3 (83), if no subsequent failure conditions are received prior to a state. 1-3 timeout, then the system returns to state 1-1 (81). Alternatively, if a third failure indication "M" is received prior to a state 1-3 (93) timeout, then the system sends a strong domain A alarm "X" (action 85), and may also take additional action within domain A (action 86). The strong domain A alarm "X" may be similar to the mild domain A alarm "X" but with a different severity value, or may be an entirely different alarm, depending upon the diagnostic information regarding domain A. The corrective action is limited to devices managed by the network management system generating alarm "X," however. Following such actions, the system returns to state 1-1 (81).

Figure 9:
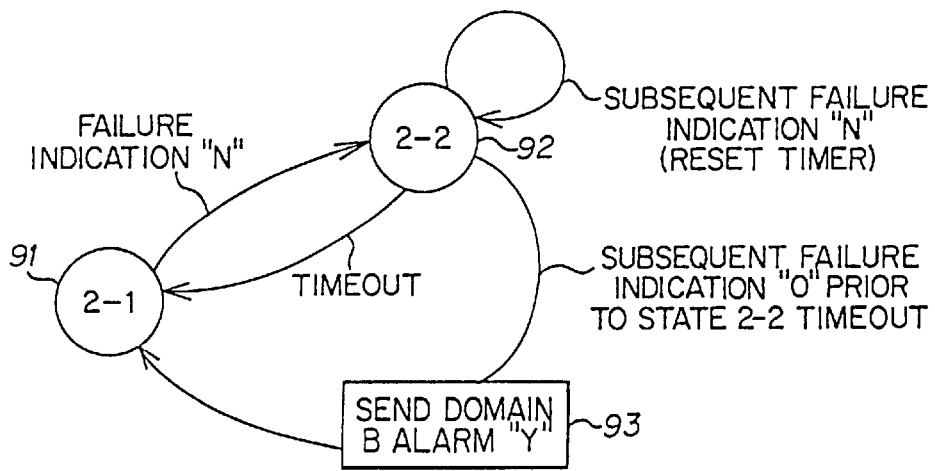
FIG. 9 is a state transition diagram illustrating correlation between intra-domain alarms from a single domain.

FIG. 9 shows an STG for a domain different from the domain represented by FIG. 8, for example domain B in FIG. 3, managed by NMS 11B. FIG. 9 is an example of a single-domain STG in which an alarm should be sent if a second type of a failure indication is received within a certain amount of time following a first type of a failure indication.

In FIG. 9, state 2-1 (93) represents an initial condition. In response to a failure indication "N" from within domain B, the system transitions to state 2-2 (92). Subsequent failure indications "N" may cause the system to stay within state 2-2, and may also reset a timer which would otherwise return the system to state 2-1 (91) if no further failure indications "N" are received within a certain amount of time. If a failure indication "O" is received prior to a state 2-2 timeout, then domain B alarm "Y" is sent (action 93). Both failure indications "N" and "O" are generated from devices within domain B.

Figure 10:
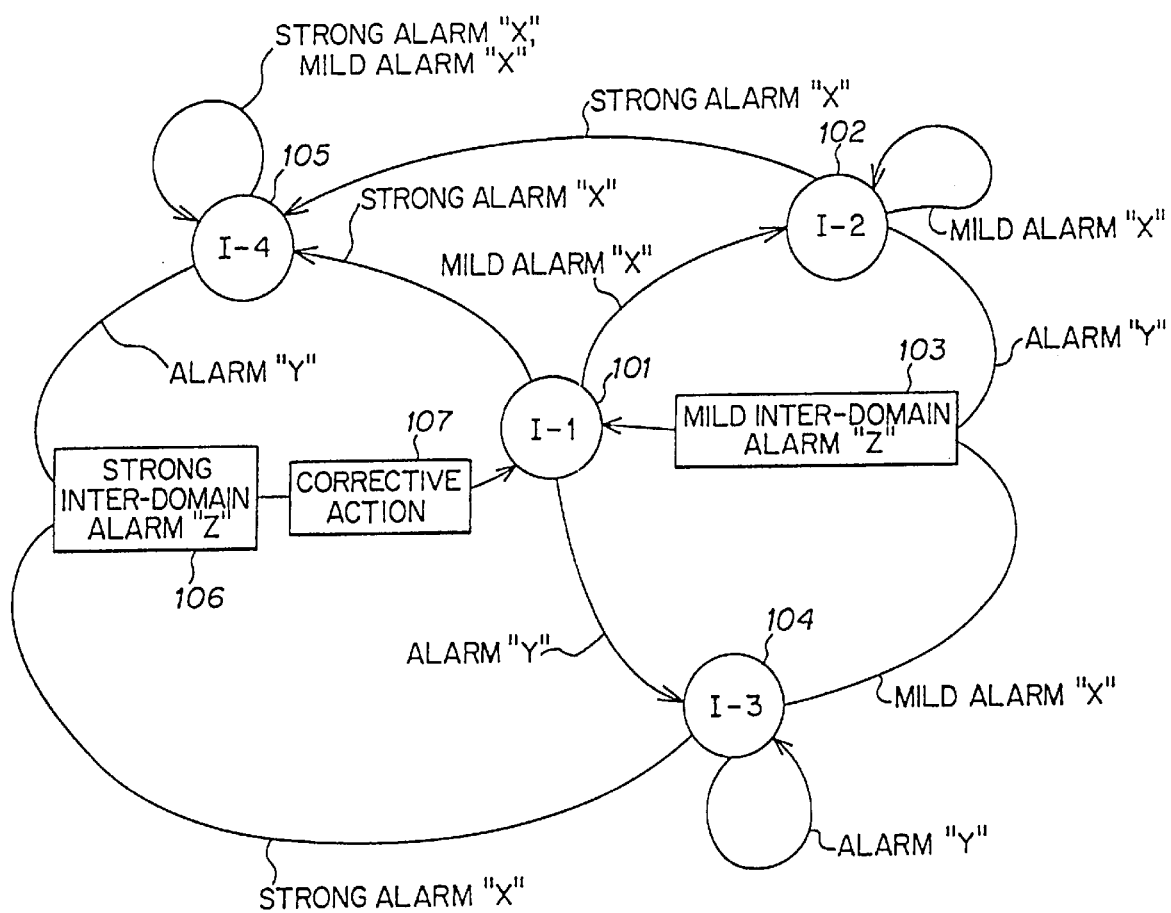
FIG. 10 is a state transition diagram illustrating correlation of intra-domain alarms, for example alarms generated from the state transition diagrams of FIGS. 8–9, to generate inter-domain alarms.

FIG. 10 is an example of an inter-domain STG which uses the results of the STGs of FIGS. 8–9. For example, the inter-domain STG of FIG. 10 may represent an implementation of the inter-domain correlation system 32. Such an inter-domain STG has the capability of analyzing and responding to intra-domain alarms in conjunction with one another. Since the intra-domain alarms represent some previous analysis, the inter-domain STG provides insight into domains A and B which was not previously possible.

State 1-1 (101) represents an initial condition of the inter-domain STG. In response to a mild alarm "X" (for example, as sent during action 84 of FIG. 8), the system transitions to state 1-2 (102). Subsequent mild alarms "X" will not change the state, but if an alarm "Y" is received (for example as sent during action 93 of FIG. 9), then a mild inter-domain alarm "Z" is generated (action 103). With previous systems, such an inter-domain alarm "Z" would not be possible, because no system used the results of the respective network management systems of two different domains.

If an alarm "Y" is received first while the system is in state 1-1 (101), then the system transitions to state 1-3 (104). Subsequent alarms "Y" do not change the state, but if a mild alarm "X" is received, then the mild inter-domain alarm "Z" will be sent (action 103). FIG. 10 does not show timeouts, but such timeouts as depicted in FIGS. 8–9 may also be applied to the inter-domain STG of FIG. 10.

If a strong alarm "X" is received while the system is in state 1-2 (102) or from the initial state 1-1, then the system transitions to state 1-4 (105). In this example, subsequent strong alarms "X" and mild alarms "X" do not change the state. However, if an alarm "Y" is received subsequent to a strong alarm "X", then a strong inter-domain alarm "Z" is generated (action 106), and corrective action (107) may also be taken. Such actions 106, 107 may also be taken if a strong alarm "X" is received subsequent to an alarm "Y". The corrective action 107 may represent actions which would not have been taken were it not for the correlation of intra-domain alarm "X" with intra-domain alarm "Y", because each of the inter-domain network management systems only have knowledge regarding devices within their respective domain.

In one embodiment, the alarm notifier 31 (see FIG. 3) is the SPECTRUM Alarm Notification Manager (SANM) described above, and each network management system 11A–11C is an instance of SPECTRUM. The response interface 33 is the SPECTRUM Command Line Interface (CLI). Such a CLI facilitates commands, queries, and other responses to be provided to any appropriate instances of SPECTRUM.

Alternatively, the inter-domain alarm correlation system 32 may be implemented as a state transition graph (STG) in the product NerveCenter, available from NetLabs Inc., 4920 El Camino Real, Los Altos Calif. 94022. Alternatively, the inter-domain alarm correlation system 32 may be implemented in specially-designed hardware such as a state machine, or in any of several programming languages on a general purpose computer, or as a programmed general purpose computer itself.

Figure 11:
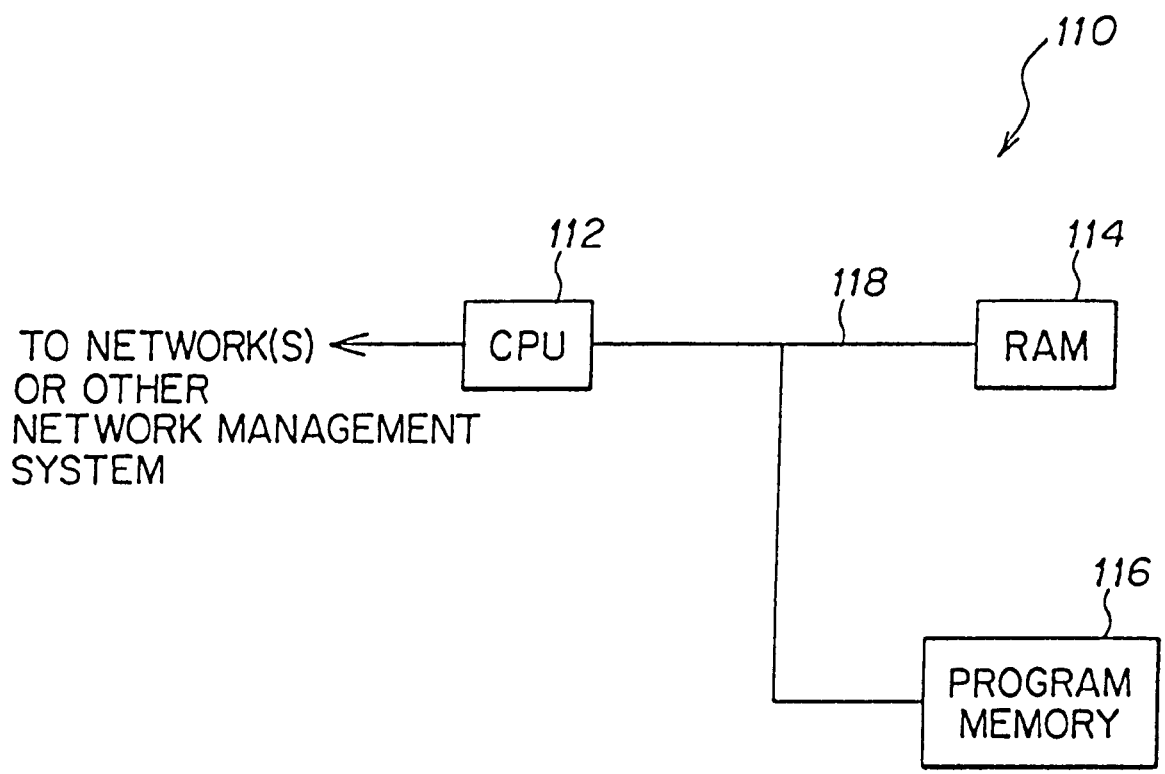
FIG. 11 is a block diagram of a general purpose computer which may be employed to implement embodiments of the invention.

For example, elements of the multi-domain manager 30 may be implemented as software on a floppy disk, compact disk, or hard drive, which controls a computer, for example a general purpose computer such as a workstation, a mainframe or a personal computer, to perform the process steps disclosed in FIGS. 6–10. Such a general purpose computer 110, shown in FIG. 11, typically includes a central processing unit 112 (CPU) coupled to random access memory (RAM) 114 and program memory 116 via a data bus 118. The general purpose computer 110 may be connected to the network 10 in order to receive reports, and may provide commands to devices on the network in order to control the network configuration.

Alternatively, the elements of the multi-domain network manager 30 may be implemented as special purpose electronic hardware. Additionally, in either a hardware or software embodiment, the functions performed by the different elements within the multi-domain network manager 30 may be combined in varying arrangements of hardware and software.

Having thus described various illustrative embodiments of the invention, additional modifications and improvements will readily occur to those skilled in the art and are intended to be within the scope of the invention. Accordingly, the foregoing description is by way of example only, and not intended to be limiting.

What is claimed is:

1. An apparatus that manages first and second domains of a communication network, the apparatus comprising:
   an input that receives first and second intra-domain alarms generated by first and second domain management systems correlating the first and second intra-domain alarms to generate a result;
   means for determining a corrective action based upon the first and second intra-domain alarms; and
   means for providing the corrective action to a network resource within the communications network.

2. The apparatus according to claim 1, further comprising a state machine having an input that receives the first and second intra-domain alarms and an output that provides an indication of severity and an indication of correlation of the first and second intra-domain alarms.

3. The apparatus according to claim 1, wherein the first domain management system determines a single-domain corrective action based upon a single-domain correlation of status information received from the first domain, and the first domain management system has an output that provides the single-domain corrective action to a network resource within the first domain.

4. The apparatus according to claim 1, wherein the first and second domain management systems are network management systems.

5. The apparatus according to claim 1, wherein the first and second domains are determined based on at least one of the group comprising:
   geographical location;
   organization; and
   functional characteristics.

6. The apparatus according to claim 1, further comprising means for correlating the first intra-domain alarm with the second intra-domain alarm to generate an inter-domain alarm.

7. The apparatus according to claim 6, further comprising:
   means for analyzing the inter-domain alarm to determine a corrective action; and
   means for providing a command to a network resource within the communications network to implement the corrective action.

* * * * *